United States Patent [19]
Miller

[11] 3,814,205
[45] June 4, 1974

[54] INSTRUMENT PANEL COVER

[75] Inventor: Lyle Eugene Miller, Dubuque, Iowa

[73] Assignee: Deere & Company, Moline, Ill.

[22] Filed: Sept. 18, 1972

[21] Appl. No.: 289,990

[52] U.S. Cl.................................. 180/90, 296/70
[51] Int. Cl........................................... B60k 35/00
[58] Field of Search........... 180/90; 296/70; 292/88; 160/213; 220/29; 312/22, 297

[56] References Cited
UNITED STATES PATENTS

| | | | |
|---|---|---|---|
| 1,600,497 | 9/1926 | Wheeler.............................. | 292/88 |
| 1,659,393 | 2/1928 | Dickinson et al................. | 312/22 X |
| 1,930,573 | 10/1933 | Weataerford..................... | 180/90 X |
| 3,557,897 | 1/1971 | Conner.............................. | 180/90 |

Primary Examiner—Stanley H. Tollberg
Assistant Examiner—Larry Martin
Attorney, Agent, or Firm—H. Vincent Harsha

[57] ABSTRACT

A generally rectangular instrument panel cover is pivotally connected at the lower edge of an instrument panel and is swingable to a closed position overlying the panel. Intermediate the top and bottom edges of the instrument panel cover, as considered when in its closed position, is a hinge joint which permits the top half of the panel cover to be pivoted to a parallel superposed position relative to the bottom half, both halves then being pivoted together to a lower stored position. The panel is apertured so as to receive locking means for receiving a padlock to lock the cover both in its closed and stored positions.

6 Claims, 3 Drawing Figures

INSTRUMENT PANEL COVER

BACKGROUND OF THE INVENTION

The present invention relates to instrument panel covers and more particularly relates to an instrument panel cover for use on off-the-road vehicles.

Off-the-road vehicles are often parked in remote areas when they are not in use. Because of the large incidences of vandalism such as the breaking of the glass in the instrument panels, it is now common practice to provide many off-the-road vehicles with some sort of cover which can be locked over the instrument panel when the vehicle is not in use.

By and large, the known instrument panel covers serve the purpose of protecting the instrument panel if the covers are used, however some are quite cumbersome in construction and cannot be conveniently used, or stored when not in use, and thus are not used by some operators.

Another problem attendant with leaving vehicles unattended is the problem of safety. While most vehicles are provided with a parking brake to prevent the vehicle from being moved when the brake is set, these brakes can be inadvertently or even purposely unlatched thus permitting the vehicle to roll if it is on a downgrade which may result in personal injury to the person who released the brake as well as bystanders and/or may result in damage to the vehicle itself.

SUMMARY OF THE INVENTION

According to the present invention, there is provided an instrument panel cover for use with an off-the-road vehicle.

It is an object of the invention to provide such an instrument panel cover which is simple in design and can be easily moved from an operative closed position to an inoperative stored position.

It is a further object of the invention to provide such an instrument panel cover which, when it is locked in its closed position, is in close proximity to the end of a parking brake release rod so as to prevent the rod from being moved a distance necessary for causing the latching mechanism of the parking brake lock from becoming disengaged.

Still another object is to provide an instrument panel cover as aforementioned which is hinged intermediate its top and bottom ends thus permitting the cover to be folded in half so that it will occupy less space when in its stored position below the instrument panel.

These and other objects will become apparent from the ensuing description and appended drawing.

DESCRIPTION OF THE PREFERRED EMBODIMENT

Figure 1:
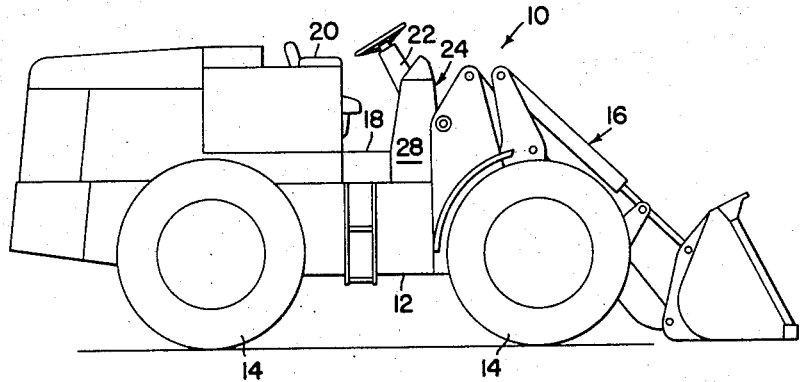
FIG. 1 is a side view of a vehicle of the type on which the instrument panel cover of the invention is adapted for use.
Figure 2:
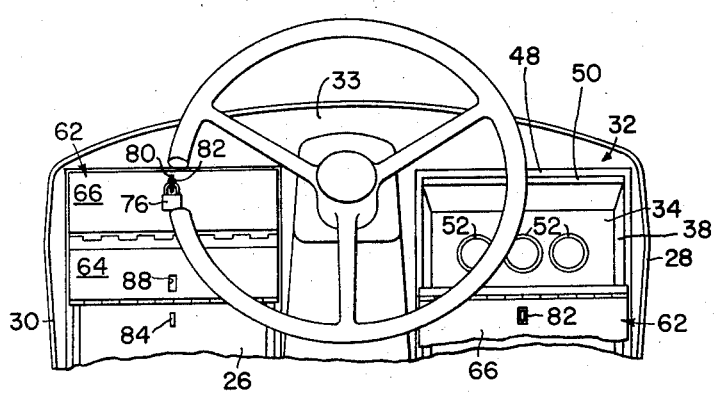
FIG. 2 is a front view of a pair of the instrument panel covers as used on a vehicle having separated instrument panels with the right instrument panel cover being shown in its inoperative stored position and with the left instrument panel cover being shown in its operative closed position.

Referring now to FIG. 1, therein is shown an industrial tractor-loader combination which is representative of the off-the-road type vehicles with which the present invention is particularly adapted for use, the vehicle being indicated in its entirety by the reference numeral 10. The vehicle 10 includes a main frame 12 which is supported on front and rear pairs of ground wheels 14, only one of each pair being shown. Supported from the forward end of the main frame 12, in a manner conventional in the art, is a loader linkage and bucket assembly 16. Located on the frame 12 rearwardly of the assembly 16 is an operator's station comprising a platform 18 having an operator's seat 20 located at the rear thereof and having a steering assembly including a wheel and column 22 located at the forward portion thereof.

The steering column 22 extends upwardly and rearwardly from a forward housing 24 defining a forward wall 26 and opposite right and left side walls 28 and 30. Located within the housing 24 is an instrument panel supporting structure 32 which inclines downwardly and rearwardly from its top to its bottom and has outer coplanar surface portions 33 surrounding all but the lower ends of substantially identical right and left recesses 34 and 36 respectively on the opposite side of the steering column.

Each of the recesses 34 and 36 includes right and left generally upright transversely spaced side walls 38 and 40, which extend from the bottom to a location spaced below the top of the structure 32, and a bottom wall 42 which extends transversely between the side walls 38 and 40 and includes first and second portions 44 and 46 which respectively diverge away from and converge toward the plane containing the surface portion 33, when considered in the direction from the bottom to the top of the structure 32. Bordering all but the lower portion of the recess and forming a part of the side walls 38 and 40 and the upper end of the bottom wall second portion 46 is a seating surface 48, having a purpose to be presently described, and which is inclined so as to intersect the bottom wall 42 adjacent the lower end thereof. The second bottom wall portion 46 includes an intermediate mounting section 50 extending parallel to the first portion 44 and forming a step between the first portion 44 and the seating surface 48. Respectively located within the recesses 34 and 36 are right and left groupings of operator's instruments such as temperature and water gauges, light switches and malfunction indicating lights, etc. Only the right grouping is shown and it is indicated in its entirety by the reference numeral 52. As can best be seen in FIG. 3, the upper end of a parking brake release rod 54 is located in the left recess 36 and is shown there in solid lines in its parking brake-engaging position, its parking brake-releasing position being indicated in dashed lines. The significance of these operating positions of the rod 54 will be described hereinafter. An instrument panel on positioning plate 58 is located in the bottom of each of the recesses 34 and 36 and overlies that portion of the bottom wall 42 extending between and including the mounting section 50 and a location spaced from the bottom of the wall 42 a distance approximately one-third of the distance between the bottom and top of the bottom wall 42. The panel 58 is held in place by means of a plurality of set screws 60. The panel 58 is appropriately apertured to receive and retain the various instruments.

Respectively associated with each of the groupings of instruments are identical instrument panel covers 62. The panel covers 62 are rectangular and each consists of two sections respectively comprising a pair of flat, rectangular plates 64 and 66 of substantially equal size joined along one of their sides by means of a hinge joint 68 defining a pivot axis extending parallel to the joined sides and located so as to permit the plate 66 to be folded into a generally parallel position above the plate 64, this folded position being shown in dashed lines in FIG. 3. Overlying the bottom portion of each of the panels 58 and held in place by at least two of the screws 60 is a first leg of an L-shaped or angular bracket 70 having a second leg extending at a right angle to the first leg and terminating at the level of the adjacent portion of the seating surface 48. The covers 62 are each pivotally secured to the terminal end of the second leg of a respective one of the L-shaped brackets 70 by means forming a horizontal hinge connection 72 including a first portion secured to the plate 64 along the side opposite from that to which joint 68 is secured and a second portion secured to one leg of the L-shaped bracket 70. Thus the hinge connection 72 defines a pivot axis which extends parallel to that defined by the hinge joint 68; and each cover 62 is pivotable, about the axis of its associated hinge connection 72, between a closed position wherein it overlies the instrument groupings, as shown in solid lines in FIG. 3, and an open or stored position wherein it extends below the axis of the connection 72, as shown in dashed lines in FIG. 3. It can thus be seen that each of the covers 62 may be moved from its closed to its stored position by first pivoting the plates 66 and 64 together about the axis of the pivot connection 72 and then by swinging the plate 66 about the axis of the hinge joint 68 into a parallel superposed position relative to plate 64.

The covers 62 are respectively held in their closed positions by means of a pair of padlocks 76, only one being shown. The padlocks 76 are respectively insertable through apertures 78 located in lugs 80, each of which are secured to a respective one of the panels 58 by welding or the like, and extend through a rectangular hole 82 located in the associated cover plate 66. As can best be seen in FIG. 3, the screws 60 are located beneath the covers 62 when the latter are in their closed position thus making it impossible for someone to remove the screws in order to gain access to the instrument panel without the necessity of first removing the covers 62.

Figure 3:
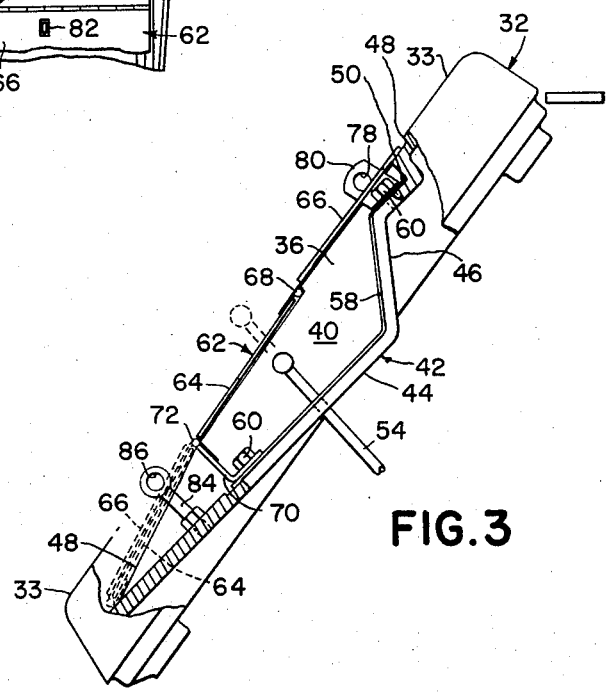
FIG. 3 is an enlarged side view of the left panel and cover of FIG. 2 with portions broken away and showing the stored position of the panel cover in dashed lines.

It is also significant to note in FIG. 3, that the cover 62 when in its closed position is located in the path of movement of the parking brake release rod 54 and prevents it from being moved from its brake-engaging position shown in solid lines to its brake-releasing position shown in dotted lines. Thus it is evident that when the cover 62 is locked in place and the release rod is in its brake-engaging position, the rod 54 cannot be moved either directly or indirectly, through means of further parking linkage not covered, to the brake-releasing position unless the cover 62 is first removed.

Means are also provided for securing the covers 46 in their open or stored positions. Specifically, below each of the instrument groupings there is located an eye bolt 84 having a lower end screwed into the support 32 and containing an aperture 86 in its upper end. The lower cover plates 64 contain a rectangular hole 88 through which the eye bolt 84 passes when the covers 62 are pivoted downwardly about the axis of the connection 72, the eye bolt 84 also being located so as to pass through the rectangular hole 82 in the upper portions 66 of the panels 62. Thus, it can be appreciated that when the panels 62 are folded about their hinge joints 68, the rectangular holes contained in the cover portions 64 and 66 are in register with each other.

The operation of the instrument panel covers 62 is thought to be obvious from the above description and in the interest of brevity, no further description is given. Suffice it to say that the covers 62 provide adequate protection for the instrument groupings and at the same time comprise a simple structure which can be conveniently moved to a stored position when not in use. Also, the left cover serves a purpose from the standpoint of safety since it prevents the parking brake from being released when the cover is locked in the operative closed position.

I claim:

1. In a vehicle having an operator's station including a seat disposed for supporting an operator facing in the forward direction of travel of the vehicle, an instrument panel supporting structure inclined downwardly and rearwardly from top to bottom and located forwardly of the seat and including a recess supporting an instrument panel therein so as to be in easy view of a seated, forwardly facing operator, and a panel cover hingedly connected to the panel cover for movement between closed and open positions respectively wherein it covers and is disposed to one side of the panel, the improvement comprising: said panel supporting structure including a coplanar surface portion bordering all but the lower end of said recess; said recess extending upwardly from the bottom of and terminating below the top of said panel supporting structure; said recess including a transverse bottom wall which includes a first portion that inclines upwardly and forwardly from the bottom of the supporting structure and diverges from the plane containing said coplanar surface portion, and a second portion contiguous with and angled upwardly from the first portion and intersecting said coplanar surface portion at a location spaced downwardly from the top of the supporting structure; said recess further including generally upright transversely spaced side walls joining the coplanar surface portion with the transverse bottom wall; said panel having a lower transverse end extending between said spaced side walls at a location spaced above the lower end of the bottom wall of the recess a distance approximately equal to one-third of the distance between the bottom of the panel supporting structure and the location whereat the second portion of the bottom wall of the recess intersects the coplanar surface portion; and angular bracket extending transversely between said side walls and having a first leg positioned in overlying relationship to the panel adjacent the lower end of the panel and having a second leg extending upwardly and rearwardly from the first leg and terminating at a location substantially in the plane of said coplanar surface portion; connecting means securing one edge of said panel cover to the upper terminal end of the second leg of the bracket and defining a first, horizontal pivot axis about which the panel cover is swingable; said panel cover being dimensioned so as to substantially cover that portion of the recess located between the bracket and the location whereat the upper end of the recess bottom wall meets said planar surface portion when the panel cover is in a closed position; said panel cover including hinge means defining a second pivot axis extending parallel to said first pivot axis and located substantially halfway from said first pivot axis in the dimension of the panel cover extending perpendicular to said first pivot axis to thus divide the panel cover into adjacent and remote sections relative to said first pivot axis; and said hinge means being located relative to said adjacent and remote sections such that the remote section is foldable to a position wherein it is substantially parallel to and overlies the adjacent section whereby the panel is foldable about said second pivot axis and swingable about said first pivot axis to selectively dispose the panel cover in a closed position, wherein it covers the panel and cooperates with said angle member to block access to said instruments, and an open position wherein it extends downwardly from said bracket between said side walls of the recess and engages the first portion of the recess bottom; and locking means for releasably securing the panel cover in said closed position.

2. The vehicle defined in claim 1 wherein said transversely spaced side walls of said recess include a seating surface means which is generally inclined from the location whereat the bottom wall meets the planar surface portion of the panel supporting structure to a location whereat it intersects the lower end of the first portion of the bottom wall of the recess; and said panel cover being dimensioned to engage said seating surface when the cover is in either of its closed and open positions.

3. The vehicle defined in claim 1 wherein said angular bracket member is secured to said panel supporting structure by means of a plurality of set screws and said set screws also serving at least as part of means securing the panel to the supporting structure.

4. The vehicle defined in claim 2 wherein said recess side walls extend fore and aft and said panel cover is substantially rectangular.

5. The vehicle defined in claim 1 wherein said locking means includes an apertured member extending from said instrument panel at a location adjacent that side of the instrument panel which is opposite from said angle member; said remote section of the cover being apertured to receive said apertured member when the cover is in its closed position; a lock mechanism being insertable in the aperture of said member and selectively lockable for preventing the cover from being moved from its closed position; said adjacent section of the cover being apertured in a location to coincide with the aperture in said remote section when the latter is folded in substantial parallelism to said adjacent portion and a second apertured member being fixedly located on said panel supporting structure so as to be received in the apertures in said adjacent and remote sections of the cover when the latter is in its open position and said lock mechanism being optionally selectively insertable and lockable within the aperture in said second member when the cover is open.

6. The vehicle defined in claim 1 wherein a parking brake actuating member projects through said panel and is shiftable between a brake-engaging position and a brake-releasing position, the latter position being toward the cover when the cover is in its closed position, and said cover, when closed, being located in the path of movement of the brake actuating member intermediate the brake-engaging and brake-releasing positions thereof whereby the parking brake cannot be released when the actuating member is in the brake-engaging position and the cover is in the closed position.

* * * * *